Jan. 17, 1950  W. A. ANDERSON  2,494,855
PIPE COUPLING
Filed Sept. 27, 1947
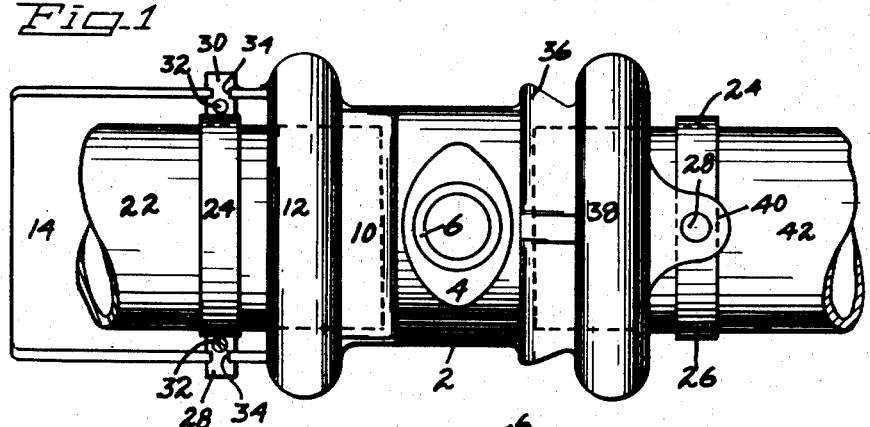
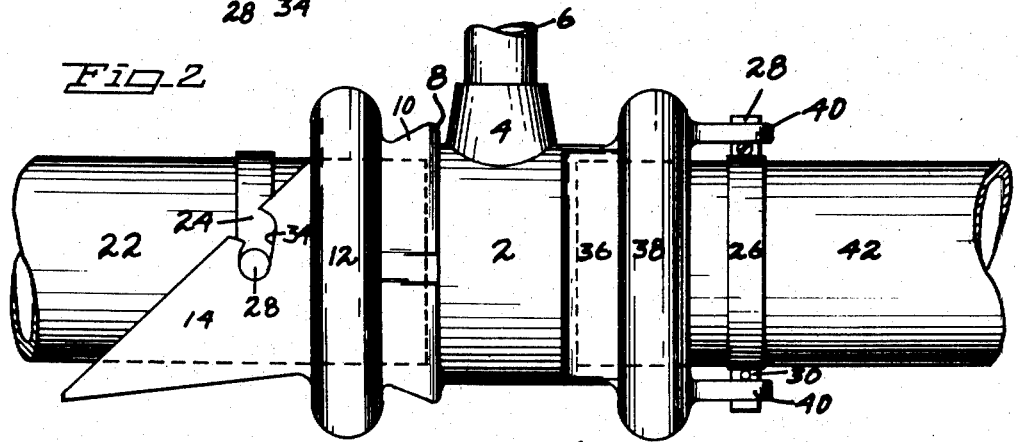
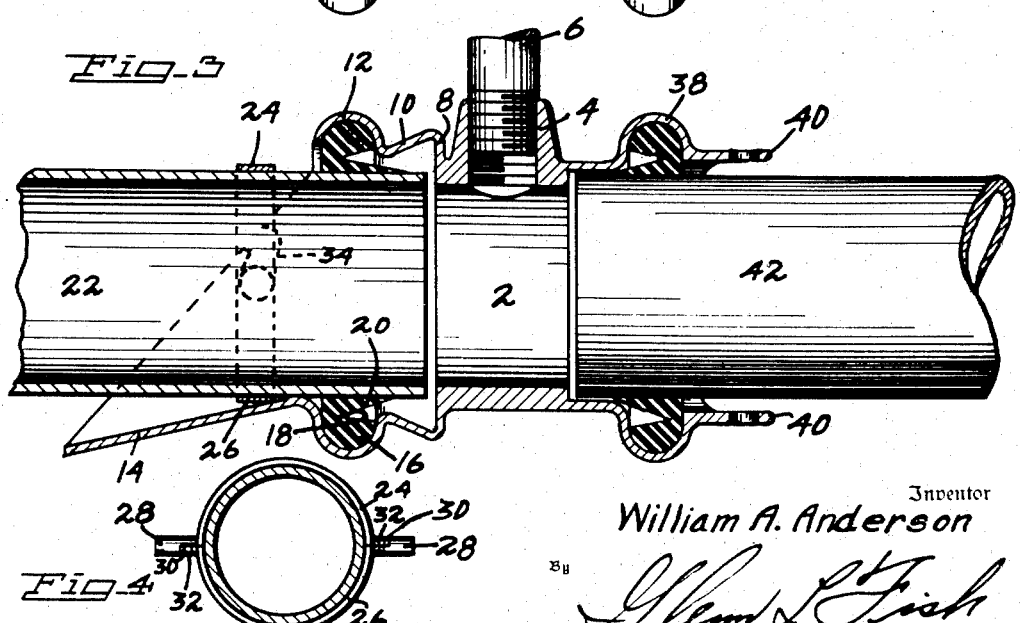
Inventor
William A. Anderson
By
Attorney Patented Jan. 17, 1950

2,494,855

UNITED STATES PATENT OFFICE 2,494,855

PIPE COUPLING

William A. Anderson, Spokane, Wash., assignor to Anderson-Miller and Poston Mfg. Co., Spokane, Wash.

Application September 27, 1947, Serial No. 776,565

2 Claims. (Cl. 285—193)

My present invention relates to an improved pipe coupling of the type especially adapted for use in joining pipe sections as in irrigation systems where the pipe is laid upon the surface of the ground and as the ground is often uneven relative irregularity of the pipe sections must be provided both vertically and horizontally.

According to my invention the coupling will provide a joint for two pipe sections and provide easy attachment and detachment, and universal movement of the sections.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 1 is a top plan view of the coupling of my invention.

Fig. 2 is a side elevational view thereof.

Fig. 3 is a longitudinal vertical sectional view.

Fig. 4 is a transverse sectional view through a pipe section and its mounting ring.

Referring now to the drawings wherein I have illustrated the present preferred embodiment of my invention, I employ a coupling consisting of a cast cylinder 2 having a nipple 4 to receive pipe 6 normally carrying a sprinkler or other discharge device, not shown.

One end of the casting is formed with an annular flange 8 bent in angularly at 10 to form opposed offsets, and fashioned into a semicircular trough 12 from which it is reduced and tapered to form the support 14.

A gasket 16 is located in the trough 12 and is fashioned of solid resilient material as rubber and has secured thereon by reduced neck 18 a tapered ring fin 20 which snugly engages the exterior of pipe section 22.

The pipe section has a ring formed of sections 24 and 26 each of which has a pair of lug portions 28 and 30 mating with the lug portions of the other section and secured by screws 32. These lugs may be fitted into bayonet slots 34 in the support 14 and it will appear that when the section 22 is inserted into the gasket fin, the fin will seal the pipe against leakage and the pipe being pivotally supported in the slots may be moved vertically, the end of the pipe being movable in the offsets 10.

At the opposite end of the cylinder 2 I also form offsets 36 and trough 38 housing a similar gasket and terminating in ears 40 for the lugs 28—30, the ears being vertically disposed so that the pipe section 42 may be pivoted on a vertical axis, horizontally.

Thus both vertical and horizontal movements are provided for the two pipe sections without complicated equipment and the coupling will afford a watertight universal joint easily assembled or disassembled in the field.

Having thus fully described my invention, what I claim as new and desire to secure by Letters Patent is:

1. A pipe coupling comprising a cylinder having pairs of horizontally and vertically disposed offsets, troughs in the cylinder and resilient gaskets in the troughs to receive and seal pipe sections, and means including detachable rings having diametrically opposed lugs for pivotally supporting said pipe sections, one on a horizontal axis and one on a vertical axis.

2. A pipe coupling comprising a cylinder having a pair of horizontally disposed offsets and ear extensions thereon and a pair of vertically disposed, angularly slotted offsets, troughs in the cylinder and resilient gaskets in the troughs to receive and seal pipe sections, and means including detachable rings having diametrically opposed lugs for pivotally supporting the pipe sections, one on a horizontal axis in the angular slots and one on a vertical axis in the ear extensions.

WILLIAM A. ANDERSON.

REFERENCES CITED

The following references are of record in the file of this patent:

UNITED STATES PATENTS

| Number | Name | Date |
|---|---|---|
| 1,620,094 | Gillick | Mar. 8, 1927 |
| 1,945,293 | Pierce | Jan. 30, 1934 |
| 2,049,801 | Gage | Aug. 4, 1936 |
| 2,290,403 | Wyss | July 21, 1942 |